J. P. LEE.
BOLL WEEVIL CATCHER.
APPLICATION FILED MAR. 21, 1918.

1,270,847.

Patented July 2, 1918.

WITNESSES

INVENTOR
Jesse P. Lee
BY
ATTORNEY

UNITED STATES PATENT OFFICE.

JESSE P. LEE, OF STOCKTON, GEORGIA.

BOLL-WEEVIL CATCHER.

1,270,847.  Specification of Letters Patent.  Patented July 2, 1918.

Application filed March 21, 1918. Serial No. 223,749.

*To all whom it may concern:*

Be it known that I, JESSE P. LEE, a citizen of the United States, residing at Stockton, in the county of Clinch and State of Georgia, have invented certain new and useful Improvements in Boll-Weevil Catchers, of which the following is a specification.

In the raising of cotton, considerable difficulty is experienced by reason of the inroads and destruction wrought by insects such as the boll weevil, and it becomes necessary to destroy or get rid of such pests. Many devices have been resorted to with this object in view, but so far as can be determined, such devices are for the most part complex in structure and cumbersome in operation.

The present invention is designed to provide means whereby the insects are dislodged from the plants and are at the same time gathered to be subsequently destroyed in any preferred and determinate way.

In accordance with the invention a catcher is mounted upon wheels and is provided with collecting troughs and knocker devices, the latter agitating the limbs of the plants in a manner to dislodge the insects which drop and are received in the troughs to be subsequently disposed of.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawings.

Corresponding and like parts are referred to in the following description and indicated in the several views of the drawings by like reference characters.

Figure 1:
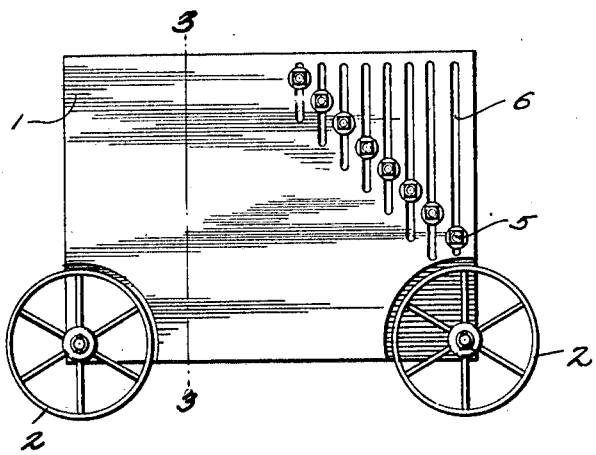
Figure 1 is a side view of an insect catcher for cotton plants constructed in accordance with and embodying the essential features of the invention.
Figure 3:
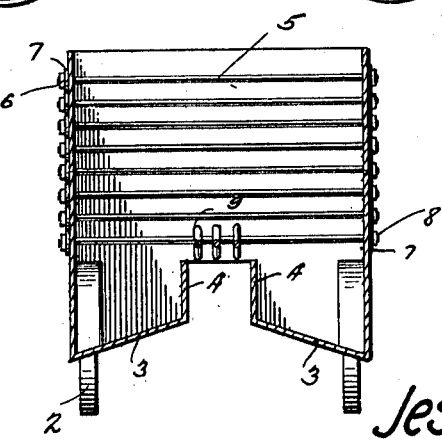
Fig. 3 is a transverse section on the line 3—3 of Fig. 1.

The device comprises a body 1 which is mounted upon wheels 2. The body 1 may be of any construction and capacity and comprises end and side walls. The bottom of the body comprises two sections 3 which are spaced apart at their inner longitudinal edges and incline outwardly and downwardly as indicated most clearly in Fig. 3. Vertical extensions 4 project upwardly from the inner longitudinal edges of the bottom sections 3, and these extensions 4 parallel the outer side walls of the body and form with the sections 3, troughs which are adapted to receive the insects as they are dislodged from the plants. As indicated most clearly in Figs. 1 and 3 the wheels 2 are set inward from the sides of the body so as not to project and cause injury to the adjacent rows of plants. The space between the vertical extensions 4 or inner sides of the troughs is such as to receive the plants of a row when the device is advanced over the field to collect the insects and free the plants from their ravages.

Figure 2:
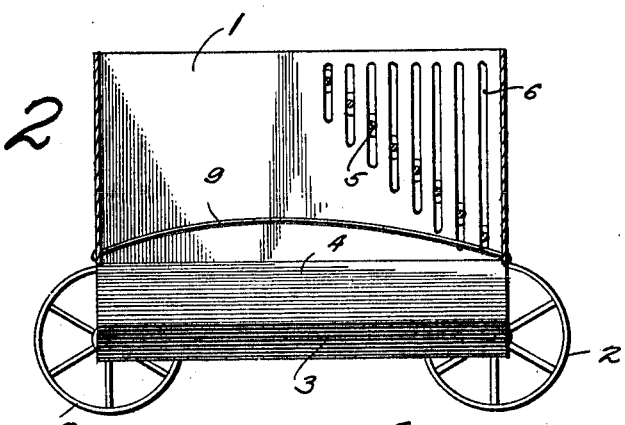
Fig. 2 is a central longitudinal section.

At the rear end of the catcher is provided a plurality of knockers whereby the branches of the plants are agitated in a manner to cause the insects to loosen their hold and drop into the troughs. These knockers consist of a plurality of rods or bars 5 which are disposed in a progressive series both vertically and longitudinally of the device. The knocker elements 5 are vertically adjustable, and for this purpose, vertical slots 6 are formed in the sides of the body 1. The slots 6 gradually increase in length from front to rear as shown most clearly in Figs. 1 and 2 thereby enabling the knockers to be adjusted in progressive order as indicated so that the foremost knocker is at the highest point and the next in a slightly lower plane and so on, throughout the series. In this manner the branches of a plant receive successive knocks or jars whereby the insects are finally caused to loosen their hold and drop into the troughs. The ends of the knocker elements 5 are threaded to receive washers 7 and nuts 8 whereby such knockers are secured in the required adjusted position.

A number of rods 9 have a longitudinal disposition and curve throughout their length, the purpose of such rods being to elevate and deflect the branches of the plants to insure proper positioning of the branches so that the insects dislodged therefrom will drop into the troughs. These rods 9 may be disposed in any desired way to effect the result intended and may be attached to the body in any manner to form a substantial support therefor.

In the operation of the device the same is advanced over the field with the space between the troughs in line with a row of plants, the branches of the latter being deflected by means of the rods 9, and such branches being jarred or agitated in a manner to dislodge the insects therefrom, such insects being received in the troughs and subsequently disposed in any manner found most advantageous.

What I claim is:

1. An insect catcher comprising a body provided with longitudinal troughs arranged upon opposite sides of a medial line and spaced apart laterally, deflecting members disposed approximately in line with the space formed between the troughs and knocking means for agitating the plants and causing the dislodged insects to be received in the troughs.

2. An insect catcher comprising a body having longitudinally disposed troughs arranged upon opposite sides of a medial line and spaced apart laterally, the bottoms of the troughs inclining laterally in an outward and downward direction, knockers disposed between the side walls of the body and extending over the troughs and the space formed between such troughs, said knockers having a progressive arrangement vertically and longitudinally, and longitudinally disposed deflecting members for moving the branches of the plants laterally into position over the troughs to insure dropping of the dislodged insects into the troughs.

In testimony whereof I affix my signature in presence of two witnesses.

JESSE P. LEE.

Witnesses:
R. I. TOMLINSON,
C. W. COWART.

Copies of this patent may be obtained for five cents each, by addressing the "Commissioner of Patents, Washington, D. C."